May 26, 1931.  F. SZCZESNY ET AL  1,807,018
PICKER CHECK FOR LOOMS
Filed Feb. 6, 1930  2 Sheets-Sheet 1
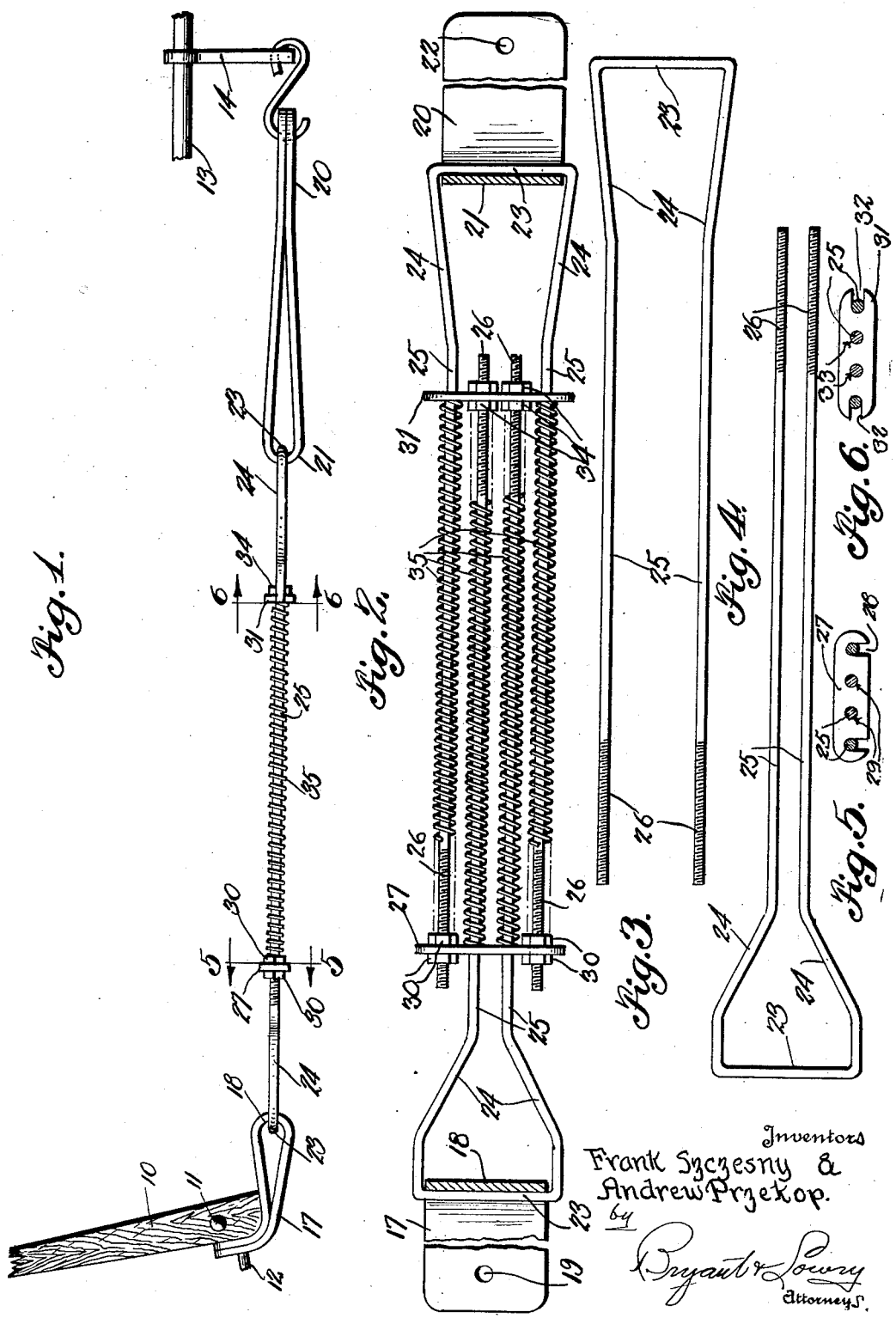
Inventors
Frank Szczesny &
Andrew Przekop.
by
Bryant & Lowry
Attorneys.

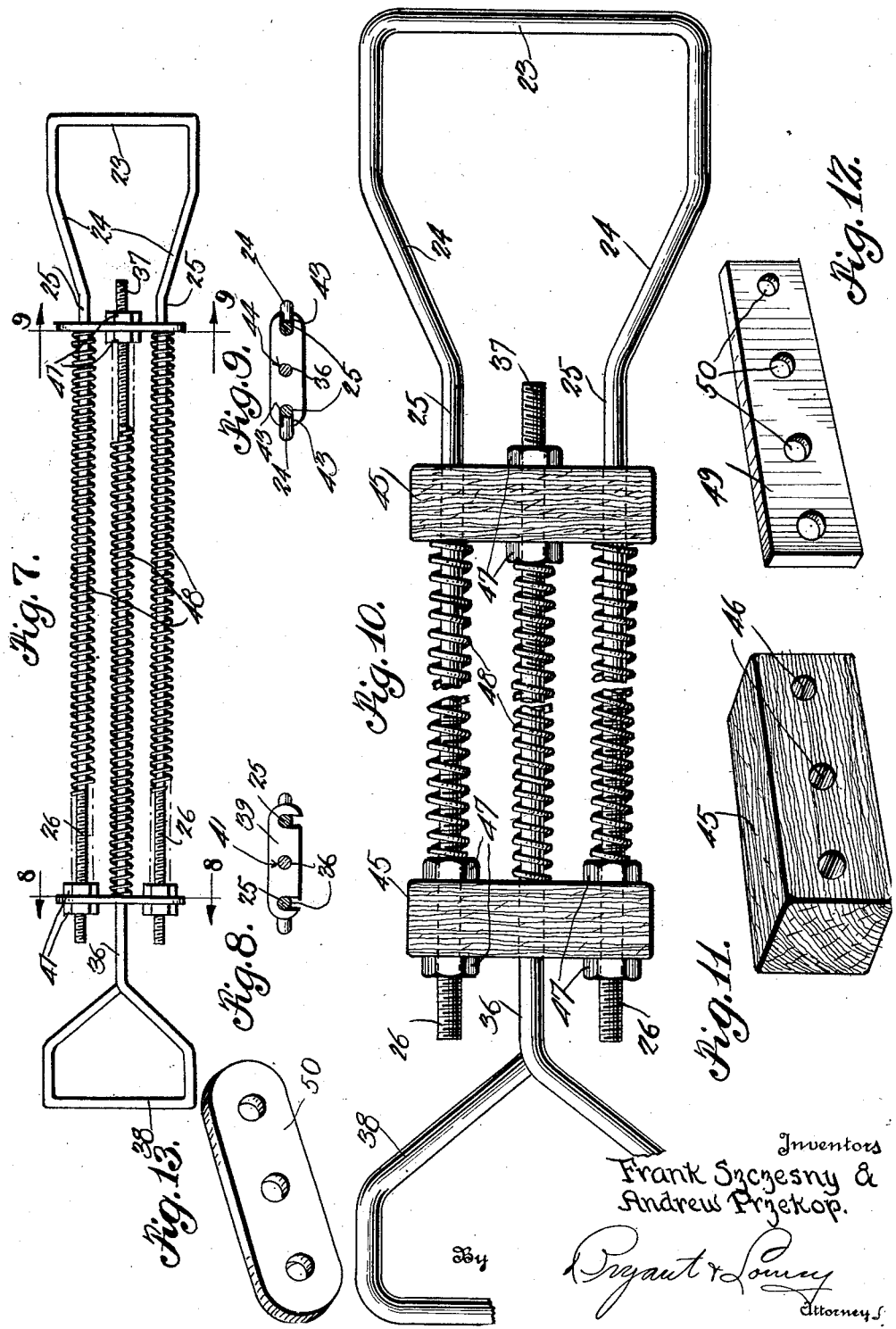

Patented May 26, 1931

1,807,018

UNITED STATES PATENT OFFICE

FRANK SZCZESNY AND ANDREW PRZEKOP, OF NORWICH, CONNECTICUT

PICKER CHECK FOR LOOMS

Application filed February 6, 1930. Serial No. 426,366.

This invention relates to the picker sticks of looms and has special reference to spring checks for picker sticks.

One important object of the invention is to improve the general arrangement of loom picker sticks and spring checks therefor.

A second important object of the invention is to provide improved forms of springs for use in connection with picker sticks.

A third important object of the invention is to provide a spring of novel construction in which the parts can be quickly assembled and dis-assembled.

With the above and other objects in view, the invention consists in general of certain novel details of construction and combinations of parts hereinafter fully described, illustrated in the accompanying drawings and specifically claimed.

In the accompanying drawings, like characters of reference indicate like parts in the several views, and:—

Figure 1 is a side elevation of a portion of a loom showing the improved spring and the parts to which it is connected;

Figure 2 is a plan view of one form of the improved spring.

Figure 3 is a detail of one frame member of this spring;

Figure 4 is a detail of the other frame member;

Figure 5 is a section on the line 5—5 of Figure 1;

Figure 6 is a section on the line 6—6 of Figure 1;

Figure 7 is a plan view of a second form of this spring;

Figure 8 is a section on the line 8—8 of Figure 7;

Figure 9 is a section on the line 9—9 of Figure 7;

Figure 10 is an enlarged plan view of a third form of the spring;

Figure 11 is a perspective view of one of the frame spacers used with Figure 10;

Figure 12 is a perspective view of a modified spacer for use with the form shown in Figure 2; and Figure 13 is a view showing a three hole plate for use with the form shown in Figure 7.

In Figure 1 there is shown the lower part of a picker stick 10 mounted on a suitable pivot 11 and having its lower end rounded in quarter circular form at one corner. Projecting from the stick between the pivot and the rounded corner is a pin 12. To the right there is disclosed a suitable loom part, here shown as the rocker shaft 13 on which the lay swords are mounted, the latter not being shown. A bracket arm 14 of rod like construction is carried by this shaft 13 and is provided with a hook 15 on its lower end. A leather strap, 17, doubled to provide a bight 18, has registering openings 19 in its ends which receive the pin 12 to attach the strap 17 to the picker stick. A similar but longer leather strap 20 is doubled to provide a bight 21 and has its ends provided with registering openings 22 to receive the bracket rod 14, the strap being connected to the rod by the hook 15. Obviously the spring arrangement may, if desired, be turned end for end and the longer strap engaged on the pin 12 and the shorter by hook 15.

The form of spring shown in Figures 1 to 6 inclusive has a pair of frame members of like shape. Each of these frame members consists of a metallic rod bent intermediate its ends to provide a central transverse portion 23 and a pair of converging loop sides 24 extending from the portion 23 and terminating in parallel frame legs 25 provided with screw threads 26 for a considerable distance at their free ends. The legs of one frame member are more widely spaced than the legs of the other member, the spacing being in the proportion of three to one so that when properly assembled, as shown in Figure 2, there will be even spaces between all four legs.

A spacer 27 is used to hold the legs in proper position at the end of the device adjacent the strap 17 and had downwardly opening natches 28 adjacent its ends for the reception of the outer legs 25 and openings 29 for the reception of the inner legs 25. The notches 28 receive the threaded portions of the outer legs and the spacer is secured in position by a pair of nuts 30 on opposite sides of the spacer on each threaded portion 26 of the outer legs. Adjacent the other end of the device is a similar spacer 31 having outwardly opening notches 32 and intermediate openings 33 for the same purposes as the similar parts of the spacer 27. This spacer is likewise held in position by pair of nuts 34 screwed on the threaded portions of the inner legs 25. Coiled compression springs 35 surround the legs 25 between the spacers, each spring bearing at one end against a spacer and at its other end against a respective nut. In this form, as in those presently to be described, the straps lead through the looped ends of the frame members so that the transverse portions 23 rest in respective bights 18 and 21.

In the form shown in Figures 7 to 10, one frame member is like those previously described while the other frame member consists of a rod 36 having one threaded end 37 and provided with a loop 38 at its other end.

In the form shown in Figures 7 to 9 metal spacers are used similar to those previously described, one of these spacers 39 having a pair of downwardly opening slots 40 and a central opening 41, while the other spacer 42 has a pair of laterally opening slots 43 and a central opening 44.

In the form shown in Figures 10 and 11, these spacers are replaced by wooden blocks 45 having three openings 46 for the frame legs. In both the second and the third form, pairs of opposed nuts 47 are screwed on the threaded portions of the frame legs to hold the spacers in place. Coiled springs 48 are mounted on the frame legs as before.

The spacer plate 49 shown in Figure 12 is a modification of those used in the first form being provided with four holes 50 for the frame legs. The metal spacer plate 50 of Figure 13 is a similar modification for use with the form shown in Fig. 7. This plate may be used in place of that shown in Fig. 9.

The springs in each case are adjusted for tension by the nuts and it will be noted that the two frame members may be readily separated by loosening the nuts on the outer legs and springing the legs first down and then apart. By the use of these springs, breakage of the picker stick is prevented.

There has thus been provided a simple and efficient device of the kind described and for the purpose specified.

It is obvious that minor changes may be made in the form and construction of the invention without departing from the principles involved. It is not, therefore, desired to confine the invention to the exact forms herein shown and described but it is desired to include also all others that come within the scope claimed.

Having thus described the invention, what is claimed as new is:—

1. In a spring for loom picker sticks, a pair of frames having legs extending side by side in opposite directions, frame spacers fixed to the legs of respective frames adjacent their ends and having the remaining legs slidable therethrough, and coiled compression springs surrounding said legs between said spacers, said spacers having open notches wherein the legs of one frame are received.

2. In a spring for loom picker sticks, a pair of frames having legs extending side by side in opposite directions, frame spacers fixed to the legs of respective frames adjacent their ends and having the remaining legs slidable therethrough, and coiled compression springs surrounding said legs between said spacers, said spacers having open notches wherein the legs of one frame are received, the ends of said legs being threaded for a considerable length and provided each with a pair of opposed nuts between which respective spacer plates are gripped.

3. In a spring for loom picker sticks, a pair of frames having legs extending side by side in opposite directions, frame spacers fixed to the legs of respective frames adjacent their ends and having the remaining legs slidable therethrough, and coiled compression springs surrounding said legs between said spacers, said spacers having open notches wherein the legs of one frame are received, the notches of one spacer plate opening at right angles to the notches of the other spacer plate whereby movements in two directions are necessary to free the legs engaged in said notches.

4. In a spring for loom picker sticks, a pair of frames having legs extending side by side in opposite directions, frame spacers fixed to the legs of respective frames adjacent their ends and having the remaining legs slidable therethrough, and coiled compression springs surrounding said legs between said spacers, said spacers having open notches wherein the legs of one frame are received, the notches of one spacer plate opening at right angles to the notches of the other spacer plate whereby movements in two directions are necessary to free the legs engaged in said notches, the ends of said legs being threaded for a considerable length and provided each with a pair of opposed nuts between which respective spacer plates are gripped.

In testimony whereof we affix our signatures.

FRANK SZCZESNY.
ANDREW PRZEKOP.